(12) United States Patent
Ignell et al.

(10) Patent No.: US 12,376,578 B2
(45) Date of Patent: Aug. 5, 2025

(54) MOSQUITO ATTRACTANT FORMULATIONS AND USES THEREOF

(71) Applicant: ACTIVE SCENT AB, Gothenburg (SE)

(72) Inventors: Rickard Ignell, Lund (SE); Stefanos Andreadis, Kavala (GR); Christos Spanoudis, Salonika (GR); Göran Birgersson, Gothenburg (SE)

(73) Assignee: ACTIVE SCENT AB, Gothenburg (SE)

( * ) Notice: Subject to any disclaimer, the term of this patent is extended or adjusted under 35 U.S.C. 154(b) by 987 days.

(21) Appl. No.: 17/290,360

(22) PCT Filed: Nov. 19, 2019

(86) PCT No.: PCT/EP2019/081849
§ 371 (c)(1),
(2) Date: Apr. 30, 2021

(87) PCT Pub. No.: WO2020/104483
PCT Pub. Date: May 28, 2020

(65) Prior Publication Data
US 2021/0315194 A1    Oct. 14, 2021

(30) Foreign Application Priority Data
Nov. 20, 2018    (GB) ..................... 1818904

(51) Int. Cl.
| | | |
|---|---|---|
| *A01M 1/20* | (2006.01) | |
| *A01M 1/02* | (2006.01) | |
| *A01N 25/02* | (2006.01) | |
| *A01N 25/08* | (2006.01) | |
| *A01N 25/10* | (2006.01) | |
| *A01N 25/12* | (2006.01) | |
| *A01N 35/02* | (2006.01) | |
| *A01N 35/04* | (2006.01) | |
| *A01N 35/06* | (2006.01) | |
| *A01N 59/04* | (2006.01) | |

(52) U.S. Cl.
CPC .......... *A01M 1/2016* (2013.01); *A01M 1/023* (2013.01); *A01N 25/02* (2013.01); *A01N 25/08* (2013.01); *A01N 25/10* (2013.01); *A01N 25/12* (2013.01); *A01N 35/02* (2013.01); *A01N 35/04* (2013.01); *A01N 35/06* (2013.01); *A01N 59/04* (2013.01)

(58) Field of Classification Search
None
See application file for complete search history.

(56) References Cited

U.S. PATENT DOCUMENTS

| | | | | |
|---|---|---|---|---|
| 8,945,595 | B2* | 2/2015 | Ray ........................ | A01N 35/02 |
| | | | | 514/693 |
| 2005/0210737 | A1* | 9/2005 | Durand ................. | A01M 1/023 |
| | | | | 43/107 |
| 2010/0115825 | A1* | 5/2010 | Bedoukian ............. | A01N 31/02 |
| | | | | 43/107 |
| 2010/0234457 | A1* | 9/2010 | Taranta .................. | A01N 25/04 |
| | | | | 514/520 |
| 2011/0289824 | A1* | 12/2011 | Wu ........................ | A01N 33/24 |
| | | | | 43/132.1 |
| 2014/0242199 | A1* | 8/2014 | Manhas ................. | A01N 65/24 |
| | | | | 424/754 |
| 2015/0216182 | A1* | 8/2015 | Brown ................... | A01N 35/06 |
| | | | | 546/318 |
| 2021/0287490 | A1* | 9/2021 | Mailleux ............. | G07F 17/3262 |
| 2021/0298297 | A1* | 9/2021 | de Boer ............... | G01N 33/497 |

FOREIGN PATENT DOCUMENTS

| | | | |
|---|---|---|---|
| WO | WO 00/65910 A1 | | 11/2000 |
| WO | WO 2005/096824 | | 10/2005 |
| WO | WO 2007099347 | * | 9/2007 |
| WO | WO 2008/088546 A2 | | 7/2008 |
| WO | WO 2015/089661 | | 6/2015 |
| WO | WO 2017/060682 | | 4/2017 |
| WO | WO 2018142158 | | 8/2018 |
| WO | WO 2019/197681 | * | 10/2019 |

OTHER PUBLICATIONS

Xu et al. "1-octen-3-ole the attractant that repels" 2015.*
International Search Report and Written Opinion were mailed on Feb. 6, 2020 by the International Searching Authority for International Application No. PCT/EP2019/081849, filed on Nov. 19, 2019 and published as WO 2020/104483 on May 28, 2020 (Applicant—Active Scent AB) (13 Pages).
Zainulabeuddin, Syed et al. "Acute olfactory response of Culex mosquitoes to a human- and bird-derived attractant", Proceedings of the National Academy of Sciences, National Academy of Sciences, US, vol. 106, No. 44, Jan. 1, 2009, pp. 18803-18808.
Pingxi, Xu et al. "1-Octen-3-ol-the attractant that repels", F1000Research, vol. 4, Jan. 1, 2015, p. 156.
Sun, Wenjuan et al. "Effects of deodorization on the physicochemical index and volatile compounds of purple sweet potato anthocyanins (PSPAs)" LWT-Food Science and Technology, Academic Press, UK, vol. 68, Dec. 23, 2015, pp. 265-272.
N. Komar et al., New York Academy of Sciences, 951, 58-73 (2001).
S. B. McIver et al., J Med Entomol, 5, 422-428 (1968).
S. A. Allen et al., J Med Entomol, 43, 225-231 (2006).
Lu, Tan et al. "Odor coding in the maxillary palp of the malaria vector mosquito Anopheles gambiae." Current biology : CB vol. 17,18 (2007): 1533-44. doi: 10.1016/j.cub.2007.07.062.

* cited by examiner

*Primary Examiner* — Danah Al-Awadi
(74) *Attorney, Agent, or Firm* — Ballard Spahr LLP

(57) ABSTRACT

Described is a mosquito attractant formulation having an effective amount of each of the components 3-octanone, heptanal, benzaldehyde, sulcatone, octanal, nonanal and decanal, and uses of the same. Also described is combination products, kits-of-parts and devices having the mosquito attractant formulation.

20 Claims, 8 Drawing Sheets

MOSQUITO ATTRACTANT FORMULATIONS AND USES THEREOF

CROSS-REFERENCE TO RELATED APPLICATIONS

This application is a U.S. National Phase Application of International Application No. PCT/EP2019/081849, filed Nov. 19, 2019, which claims priority to Great Britain Application No. 1818904.3, filed Nov. 20, 2018, each of which are hereby incorporated by reference in their entirety.

FIELD OF THE INVENTION

The present invention relates to new formulations and methods for the control of mosquito populations. Specifically, it relates to formulations useful as mosquito attractants, which are useful in the trapping and/or killing of mosquitoes.

BACKGROUND OF THE INVENTION

Mosquitoes are small insects that constitute the family Culicidae. Females of most species are ectoparasites, whose tube-like mouthparts (called a proboscis) pierce the hosts' skin to consume blood. Thousands of species of mosquito are known to feed on the blood of various kinds of hosts, mainly vertebrates, including mammals, birds, reptiles, amphibians, and even some kinds of fish. Although the loss of blood is seldom of any importance to the victim, the saliva of the mosquito often causes an irritating rash that is a serious nuisance.

Much more serious though are the roles of many species of mosquitoes as vectors of infectious diseases. Vector-borne diseases like malaria present compelling challenges for global public health. In passing from host to host, some transmit infections that are extremely harmful in humans, such as malaria, yellow fever, Chikungunya, West Nile fever, dengue fever, filariasis, Zika and diseases caused by arboviruses. For this reason, the various species of mosquitoes are commonly regarded as being amongst the deadliest animals.

In both Europe and North America, *Culex* mosquitoes are nuisance pests and vectors of disease. In particular, members of the *Culex pipiens* mosquito species complex are considered the primary bridge vectors of the West Nile virus. The virus causes sporadic outbreaks of West Nile neuroinvasive disease on a global scale, with Europe and North America being most affected in recent decades. Although less than 1% of human infections progress to severe diseases, such infections typically result in up to 100 casualties per year in the most affected regions.

The West Nile virus is maintained in nature in a mosquito-bird-mosquito transmission cycle, with birds acting as reservoir hosts. While field studies have started to identify the natural avian hosts using live hosts and blood meal analysis, efforts to understand the mechanism underlying host selection and preference in the *Culex pipiens* species complex are, however, in their infancy. From the perspective of vector management, such understanding is essential for the development of tools to control and monitor mosquito populations.

Mosquito vector control strategies seek to manage the population of mosquitoes to reduce their damage to human health, economies and enjoyment, and to halt the transmission cycle of mosquito-borne diseases. Mosquito control is a vital public-health practice throughout the world and particularly in the tropics, where the spread of diseases, such as malaria, by mosquitoes is especially prevalent.

Many measures have been tried for mosquito control, including the elimination of breeding places, exclusion via window screens and mosquito nets, biological control with parasites such as fungi and nematodes, chemical control with mosquito killing agents, such as pesticides, or control through the action of predators, such as fish, copepods, dragonfly nymphs and adults, and some species of lizards.

In order to allow for the successful control of mosquitoes, for example, when using methods having a direct effect, such as when using chemical or biological agents, it is first necessary to attract mosquitoes so that they are brought into proximity or contact with the relevant agent and, in some cases, to induce the mosquitoes to consume a sufficient amount of that agent in order for it to take effect. To this end, various chemical compounds and formulations have been developed which have a mosquito attractant effect. These compounds and formulations are often combined with mosquito trapping devices, which are designed to lure and retain (e.g. by killing) the mosquito.

Nevertheless, the mosquito attractant formulations currently available have several limitations. In particular, such compounds and formulations are typically found to have only a limited attractant effect, which may diminish rapidly over time. Moreover, known mosquito control agents, such as chemical and biological control agents, often suffer from poor efficacy due to difficulties in ensuring an adequate level of consumption of such agents by the target organism. Thus, there exists a significant need for improved methods for attracting mosquitoes.

The listing or discussion of an apparently prior-published document in this specification should not necessarily be taken as an acknowledgement that the document is part of the state of the art or is common general knowledge.

Previous studies, such as N. Komar et al., New York Academy of Sciences, 951, 58-73 (2001), have shown captive and free-ranging birds may be used as living sentinels in surveillance programs.

Further studies, such as S. B. McIver et al., J Med. Entomol, 5, 422-428 (1968) and S. A. Allen et al., J Med Entomol, 43, 225-231 (2006), have also demonstrated that bird and bird derived volatile compounds may be able to attract *Culex* species.

Z. Syed and W. S. Leal, PNAS, 106 (44), 18803-18808 (2008) identified nonanal as a bioactive compound in bird and human emanates, and showed that traps baited with 1 mg of the compound attract wild egg-laying *Culex* mosquitoes.

There remains, however a need for an effective attractant formulation to be used in methods for the control of mosquitoes, and specifically *Culex* mosquito, populations.

DETAILED DESCRIPTION OF THE INVENTION

It has now been found that two species of the *Culex pipiens* complex, *Culex pipiens molestus* and *Culex quinquefasciatus*, are significantly more attracted to the odour of chickens, in particular in the presence of carbon dioxide, than other bird species, under laboratory conditions.

It has also been found that a formulation comprising certain components is able to mimic the relevant odour and provide a significant attractive effect. Moreover, it has been found that a greater proportion of *Culex* mosquitoes are attracted to the full blend of components in the composition, as described herein, than to a blend lacking any one of the required components.

In a first aspect of the invention, there is provided a mosquito attractant formulation comprising the following components:
(i) 3-octanone;
(ii) heptanal;
(iii) benzaldehyde;
(iv) sulcatone;
(v) octanal;
(vi) nonanal; and
(vii) decanal,
which may be referred to herein as the "formulation of the first aspect of the invention" or the like.

The skilled person will understand that references herein to particular aspects of the invention (e.g. references to formulations of the first aspect of the invention) will include references to all embodiments and particular features thereof.

Unless indicated otherwise, all technical and scientific terms used herein have the same meaning as commonly understood by one of ordinary skill in the art to which this invention pertains.

All embodiments of the invention and particular features mentioned herein may be taken in isolation or in combination with any other embodiments and/or particular features mentioned herein (hence describing more particular embodiments and particular features as disclosed herein) without departing from the disclosure of the invention.

As described herein, formulations of the first aspect of the invention are found to have a potent mosquito attractant effect, hence such formulations may be referred to herein as mosquito attractant formulations. Alternatively, such formulations may be referred to simply as a formulation, composition, mixture, or the like (i.e. with no reference to the mosquito attractant effect).

The skilled person will understand that the references herein to a mosquito attractant effect (or to formulations capable of mosquito attraction, mosquito lures or bait, and the like) will refer to an ability to alter the behaviour of one or more mosquitoes such that their direction of travel is altered by movement thereto.

For example, such a mosquito attractant effect may be characterised by an increase in the propensity of a sample of mosquitoes to travel in a direction as affected by the presence of the substance(s) (e.g. the formulation, such as the formulation of the first aspect of the invention) having that effect.

Such an increase may be qualitative (e.g. an observation of a general change in mosquito behaviour) or, in particular, may be quantitative (i.e. measurable). In such circumstances, such an effect may be characterised by at least a 10% (e.g. at least a 20%, such as at least a 30% or, particularly at least a 50% or, more particularly, at least a 100%) increase in the propensity of a sample of mosquitoes to adjust the direction of travel thereto.

The skilled person will be aware of various other means by which such effects may be assessed (e.g. measured) by experiments performed in a controlled setting, such as may be described in more detail herein. For example, such experiments may assess the increased bias of mosquitoes to travel towards (e.g. along a predefined pathway towards) and/or land upon the substance (i.e. the substance having the mosquito attractant effect). In such circumstances, such an effect may be characterised by at least a 10% increase in said bias, e.g. at least 20%, such as at least 30% (e.g. at least 33%) or at least 50% (e.g. at least 69%), or at least 100%.

In a particular embodiment (i.e. a particular embodiment of the first aspect of the invention), the formulation consists essentially of each of components (i) to (vii).

As used herein, the term "consist essentially of" may be understood to mean that the composition (e.g. the formulation of the first aspect of the invention) contains no significant amount of any component other than those specified. In particular, the term may indicate that less than 10% (e.g. less than 5%, such as less than 1% or, particularly, less than 0.1%) of the composition (e.g. the formulation) is formed from components other than those specified. Alternatively, the term "consists essentially of" as used herein may be replaced with the term "consists of", or the like.

In other embodiments that may be mentioned, the composition may comprise (or consist essentially of) the components specified with the proviso that the composition does not comprise other components having an effect on mosquito behaviour (i.e. components that alter, such as by diminishing, the effects of the formulation of the first aspect of the invention, as described herein). In one embodiment, the composition does not comprise (or does not comprise a significant amount of) a mosquito repellent, excluding carbon dioxide, such as DEET and/or 1-octen-3-ol.

For the avoidance of doubt, the skilled person will understand that the references herein to compositions (e.g. formulations) comprising certain compounds will refer to those compositions containing a detectable (i.e. measurable) amount of that compound (e.g. measurable using analytical techniques known to those skilled in the art, such as various chromatographic techniques). In particular, they may refer to such compositions containing a significant amount of that compound, which may be understood to refer to an amount sufficient for the presence of the compound to have a detectable effect on a relevant function of the composition (e.g. as a mosquito attractant).

For the avoidance of doubt, references to the compounds heptanal, octanal, nonanal and decanal will be understood to be refer to the linear (i.e. non-branched) aldehydes, which may be alternatively referred to as n-heptanal, n-octanal, n-nonanal and n-decanal, respectively.

For the avoidance of doubt, the IUPAC name for the compound sulcatone is 6-methyl-5-hepten-2-one, and has the following chemical structure:

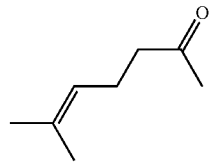

In particular embodiments that may be mentioned, the formulation of the first aspect of the invention comprises or consists essentially of (e.g. comprises) each of the compounds in amounts as indicated in the table below as a percentage of the total combined weight of those components as comprised in the formulation:

| Component | Compound | % by weight |
|---|---|---|
| (i) | 3-octanone | from about 3.1 to about 15.0 |
| (ii) | heptanal | from about 0.9 to about 5.0 |

| Component | Compound | % by weight |
|---|---|---|
| (iii) | benzaldehyde | from about 1.9 to about 5.0 |
| (iv) | sulcatone | from about 6.6 to about 15.0 |
| (v) | octanal | from about 3.1 to about 15.0 |
| (vi) | nonanal | from about 25.0 to about 75.0 |
| (vii) | decanal | from about 9.4 to about 20.0 |

For the avoidance of doubt, the skilled person will appreciate that when amounts of components are referred to as a percentage of the total combined weight of those components the combined total of each individual percentage should amount to 100%.

As used herein, the term "about" may be understood to refer to a value that is within 10% (e.g. within 5%, such as within 1%, 0.5% or, particularly, 0.2% or, more particularly, 0.1%) of the value (e.g. the amount, i.e. as a proportion thereof) specified. Alternatively, the term "about" as used herein may be removed throughout.

In more particular embodiments, the formulation of the first aspect of the invention comprises or consists essentially of (e.g. comprises) each of the compounds in amounts as indicated in the table below as a percentage of the total combined weight of those components as comprised in the formulation:

| Component | Compound | % by weight |
|---|---|---|
| (i) | 3-octanone | from about 3.1 to about 10.0 |
| (ii) | heptanal | from about 0.9 to about 2.0 |
| (iii) | benzaldehyde | from about 1.9 to about 4.0 |
| (iv) | sulcatone | from about 6.6 to about 14.0 |
| (v) | octanal | from about 3.1 to about 8.0 |
| (vi) | nonanal | from about 46.0 to about 75.0 |
| (vii) | decanal | from about 9.4 to about 16.0 |

In yet more particular embodiments, the formulation of the first aspect of the invention comprises or consists essentially of (e.g. comprises) each of the compounds in amounts as indicated in the table below as a percentage of the total combined weight of those components as comprised in the formulation:

| Component | Compound | % by weight |
|---|---|---|
| (i) | 3-octanone | from about 3.1 to about 9.4 |
| (ii) | heptanal | from about 0.9 to about 1.6 |
| (iii) | benzaldehyde | from about 1.9 to about 3.8 |
| (iv) | sulcatone | from about 6.6 to about 13.1 |
| (v) | octanal | from about 3.1 to about 7.8 |
| (vi) | nonanal | from about 48.6 to about 75.0 |
| (vii) | decanal | from about 9.4 to about 15.7 |

In yet more particular embodiments, the formulation of the first aspect of the invention comprises or consists essentially of (e.g. comprises) each of the compounds in amounts as indicated in the table below as a percentage of the total combined weight of those components as comprised in the formulation:

| Component | Compound | % by weight |
|---|---|---|
| (i) | 3-octanone | from about 5 to about 7 |
| (ii) | heptanal | from about 1 to about 1.4 |
| (iii) | benzaldehyde | from about 2.8 to about 3.4 |
| (iv) | sulcatone | from about 8 to about 10 |
| (v) | octanal | from about 5 to about 7 |
| (vi) | nonanal | from about 56 to about 66 |
| (vii) | decanal | from about 10 to about 14 |

In yet more particular embodiments, the formulation of the first aspect of the invention comprises or consists essentially of (e.g. comprises) each of the compounds in amounts as indicated in the table below as a percentage of the total combined weight of those components as comprised in the formulation:

| Component | Compound | % by weight |
|---|---|---|
| (i) | 3-octanone | from about 5 to about 7 |
| (ii) | heptanal | from about 1 to about 1.4 |
| (iii) | benzaldehyde | from about 2.9 to about 3.3 |
| (iv) | sulcatone | from about 8 to about 10 |
| (v) | octanal | from about 5 to about 7 |
| (vi) | nonanal | from about 58 to about 64 |
| (vii) | decanal | from about 11 to about 14 |

In yet more particular embodiments, the formulation will comprise (or consist essentially of) each of components (i) to (vii) in amounts as indicated in the table below as a percentage of the total combined weight of those components:

| Component | Compound | % by weight |
|---|---|---|
| (i) | 3-octanone | about 6.25 |
| (ii) | heptanal | about 1.25 |
| (iii) | benzaldehyde | about 2.50 |
| (iv) | sulcatone | about 8.75 |
| (v) | octanal | about 6.25 |
| (vi) | nonanal | about 62.50 |
| (vii) | decanal | about 12.50 |

The skilled person will also understand that formulations of the first aspect of the invention may be prepared by mixing of suitable relative amounts of each component present in the formulation (i.e. by mixing in a suitable ratio of those components).

Thus, in particular embodiments of the first aspect of the invention the ratio of each of the components is indicated in the table below:

| Component | Compound | Ratio (by weight) |
|---|---|---|
| (i) | 3-octanone | about 4 to about 6 |
| (ii) | heptanal | about 0.5 to about 2 |
| (iii) | benzaldehyde | about 1 to about 3 |
| (iv) | sulcatone | about 6 to about 8 |
| (v) | octanal | about 4 to about 6 |
| (vi) | nonanal | about 63 to about 77 |
| (vii) | decanal | about 8 to about 12 |

The skilled person will understand that such ratios as described herein may also be referred to as relative amounts (i.e. amounts relative to the other components specified).

The skilled person will understand that various synthetic blends may be prepared in accordance with the percentage values and ranges specified in order to provide the required effect.

For example, the ratio of each of the components may be as indicated in the table below:

| Component | Compound | Ratio (by weight) |
|---|---|---|
| (i) | 3-octanone | about 5 |
| (ii) | heptanal | about 1 |
| (iii) | benzaldehyde | about 2 |
| (iv) | sulcatone | about 7 |
| (v) | octanal | about 5 |
| (vi) | nonanal | about 70 |
| (vii) | decanal | about 10 |

In a particular embodiment, the ratio of each of the components may be as indicated in the table below:

| Component | Compound | Ratio (by weight) |
|---|---|---|
| (i) | 3-octanone | about 5 |
| (ii) | heptanal | about 1.25 |
| (iii) | benzaldehyde | about 2 |
| (iv) | sulcatone | about 7 |
| (v) | octanal | about 5 |
| (vi) | nonanal | about 70 |
| (vii) | decanal | about 10 |

Particular ratios and/or amounts of components (e.g. components (i) to (vii), alone or in combination) that may be mentioned include those described in the examples provided herein.

In particular embodiments the formulation is provided in liquid form. In even more particular embodiments, the formulation is provided in gaseous form or as a liquified gas. In a further embodiment, the formulation further comprises one or more additional gaseous component such that the formulation is provided as a mixture of gases, either in gaseous form or as a liquified gas. In a particular embodiment, the additional gaseous component is carbon dioxide.

In embodiments wherein the formulation of the first aspect of the invention may comprise further (i.e. additional) components, those components may be selected in order to modify certain properties of the formulation, such as to modify the viscosity, and/or to render the formulation suitable for storage and/or transport.

Thus, in particular embodiments the formulation further comprises (i.e. in addition to comprising the compounds specified) one or more additional component selected from the list consisting of: preservatives, stabilizing agents, antioxidants, colourants, solvents and gelling agents.

The skilled person will understand that the components of the formulations as described herein may be mixed together in order to provide a blend (i.e. a uniform mixture) of the components, which may be obtained and characterised using techniques known to those skilled in the art. Thus, the formulation of the first aspect of the invention may be described as being a blend of the components specified (as described herein).

The skilled person will understand that a formulation of the first aspect of the invention may be provided in a variety of physical forms, which forms will depend on the nature of the components thereof. For example, formulation may exist in liquid form, which liquid form may derive from the nature of the components of the formulation and/or the nature of any additional components.

In a particular embodiment, the formulation is provided in a liquid form (e.g. In the form of a free-flowing liquid).

In a further embodiment, the formulation may be diluted by up to a factor of 1:10000 (e.g. up to a factor of about 1:1000, such as 1:100, 1:50 or 1:10). For example, the formulation may be diluted by a factor of about 1:100.

In a more particular embodiment, the formulation is provided as a solution in a suitable solvent.

As used herein, the term "solution" may take its normal meaning in the art, namely referring to a liquid mixture in which the solute (which, in certain instances, may be the minor component) is uniformly distributed within the solvent (which, in certain instances, may be the major component).

The skilled person will understand that the reference to a suitable solvent will refer to a solvent capable of forming a solution of components (i) to (vii) and optionally any other components present in the formulation.

In particular embodiments, the combined weight of the components (i) to (vii) is at least 0.01% of the total weight of the formulation (i.e. of the formulation comprising components (i) to (vii) and any other components present).

In more particular embodiments (e.g. where the formulation is in liquid form, such as in the form of a solution as described herein), the combined weight of the components (i) to (vii) is at least 1% (such as at least 5%, at least 10%, at least 20%, at least 30%, at least 40%, at least 50%, at least 60%, at least 70%, at least 80% or at least 90%) of the total weight of the formulation (i.e. of the formulation comprising components (i) to (vii) and any other components present).

For the avoidance of doubt, in certain embodiments that may be mentioned, the formulation consists essentially of components (i) to (vii) as defined therein.

As indicated herein, the formulation may be provided in the form of a gaseous mixture, such as wherein components (i) to (vii) are mixed with other components that are in the form of a gas, such as carbon dioxide.

In alternative embodiments (e.g. wherein the formulation is in gaseous form), the combined weight of compounds (i) to (vii) is at least 0.01% of the formulation. In a further embodiment, the amount of carbon dioxide present in the formulation is at least 300 ppm.

In a particular embodiment, the formulation may further comprise a carbon dioxide agonist (i.e. an agonist of the carbon dioxide receptor in the target organism).

The skilled person will understand that formulations as described herein (such as the formulation of the first aspect of the invention, including all embodiments and features thereof) may be provided in conjunction with a solid or semi-solid carrier, wherein the formulation may be, for example, absorbed in, adsorbed on, or in suspended and/or encapsulated (e.g. where evenly distributed) with said solid or semi-solid carrier.

Thus, in particular embodiments, the formulation is provided in conjunction with a suitable solid or semi-solid carrier.

In more particular embodiments, the suitable solid or semi-solid carrier is:
  a wax, wax-like, gel or gel-like material
  an absorbent solid material or material capable of having the formulation adsorbed thereon; or
  a solid matrix capable of having the formulation contained therein.

In a further particular embodiment, examples of suitable carriers include, but are not limited to, bio-degradable porous plastic granules and wax.

As described herein, formulations of the invention may be suitable for use in attracting mosquitoes, such as those mosquitoes known to act as vectors for the transmission of diseases, such as the West Nile Virus, in humans.

Particular mosquito species (i.e. particular mosquitoes) that may be mentioned (in relation to all aspects, embodiments and features of the invention, and combinations thereof, as described herein) include *Culex* mosquitoes, such as *Culex pipiens* molestus and *Culex quinquefasciatus* (in particular, the *Culex pipiens*) mosquito species.

As described herein, formulations of the first aspect of the invention are useful as mosquito attractants, which may be employed in methods for mosquito control.

In the second aspect of the invention, there is provided the use of a formulation of the first aspect of the invention (including all embodiments and features thereof) as a mosquito attractant.

In a particular embodiment (i.e. a particular embodiment of the second aspect of the invention), the use forms part of a method of trapping and/or killing mosquitoes, such as a method described herein.

In a third aspect of the invention, there is provided a method of attracting and, optionally, trapping and/or killing mosquitoes, wherein the method comprises the step of providing a mosquito attractant formulation of the first aspect of the invention.

The skilled person will understand that references to providing a mosquito attractant formulation will refer to providing the formulation in a manner that will allow for the formulation to provide the required effect, such as by exposing a sample of the formulation to the atmosphere in the vicinity where attraction of mosquitoes is required.

In a particular embodiment (i.e. an embodiment of the third aspect of the invention), the method is a method for attracting and trapping and/or killing mosquitoes.

The skilled person will appreciate that method comprising trapping and/or killing mosquitoes may comprise the use of a device suitable for such trapping and/or killing which device may be used in conjunction with the formulation of the first aspect of the invention.

Devices suitable for trapping and/or killing mosquitoes are well-known to those skilled in the art. In particular, devices that may be suitable for use in methods as described herein (e.g. methods of the third aspect of the invention) will include those devices comprising one or more substance or composition for uses in (i.e. employed with the purposes of) attracting mosquitoes. In utilising such devices, the skilled person will appreciate that the device may be adjusted and/or modified, as appropriate, using routine skill in the art, e.g. by replacement of some or all of the substance or composition for use in attracting mosquitoes with the formulation of the first aspect of the invention, or by addition of the formulation of the first aspect of the invention to the device (i.e. in combination with the existing substance or composition).

Thus, in particular embodiments, the method is for trapping mosquitoes and the formulation is provided as part of a suitable mosquito-trapping device.

Particular mosquito trapping and/or killing devices that may be utilised in the methods described herein (e.g. in the third aspect of the invention) will be well known to those skilled in the art, such as: Mosquito Magnet®; and Biogents® devices BG-Mosquitaire, BG-Mosquitaire CO2 and BG-Mosquitaire™, and similar devices.

Thus, in particular embodiments, the method is for trapping mosquitoes and the formulation is provided as part of a suitable mosquito-trapping device.

The skilled person may understand that the components of the formulation of the first aspect of the invention may be as one or more separate entities, which may be combined (either through direct mixing or by allowing said components to evaporate in adequate proximity to each other) when in use.

Thus, in a fourth aspect of the invention, there is provided a kit-of-parts comprising each of the compounds required in the components of the first aspect of the invention, e.g. in the form of at least two separate parts (such as wherein one or more, but necessarily not all, of the components may be provided in said kit in admixture i.e. as a mixture of those components).

Further, the skilled person will understand that the product or kit-of-parts comprises a mosquito control agent and a source of gaseous carbon dioxide and/or an agonist for the mosquito carbon dioxide receptor The skilled person will understand that compositions and formulation as described herein may be prepared using routine methods known to those skilled in the art.

For example, formulations of the first aspect of the invention may be prepared by a process comprising the step of bringing into association the required components thereof.

EXAMPLES

The present invention will be further described by reference to the following examples, which are not intended to be limiting on the scope of the invention.

Example 1

A synthetic blend was containing 3-octanone, heptanal, benzaldehyde, sulcatone, octanal, nonanal, decanal in the ratio 5:1:2:7:5:70:10 was prepared using standard techniques.

Figure 1:
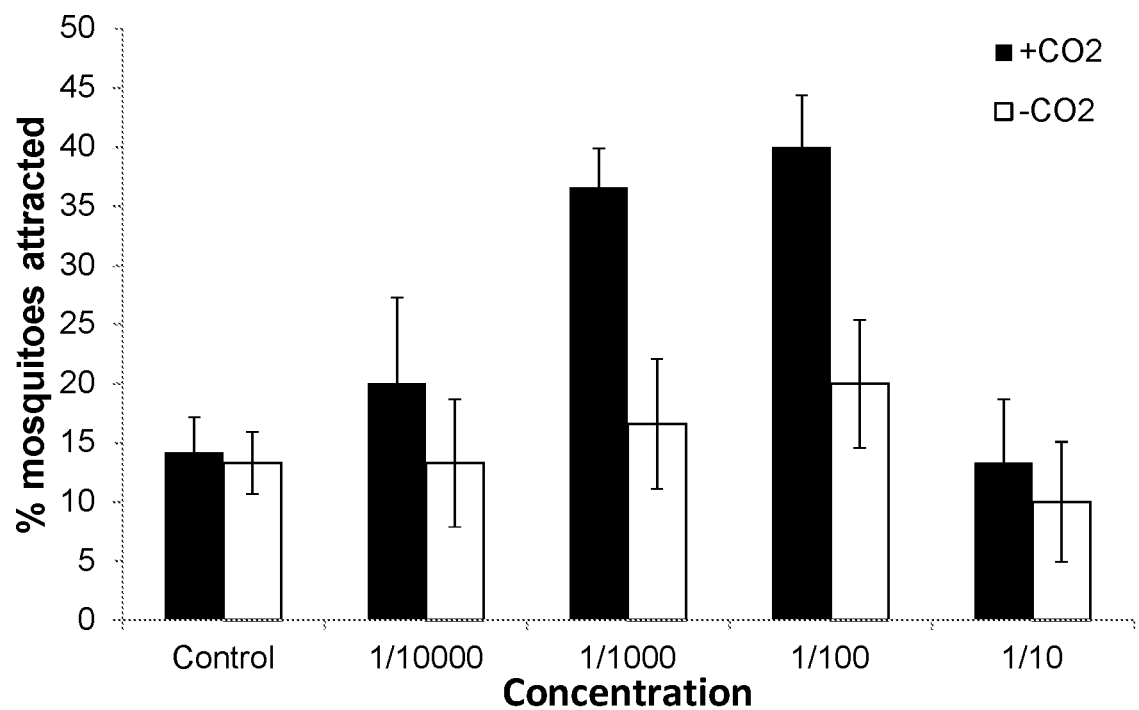
FIG. 1 is a graph showing the attraction of *Culex quinquefasciatus* to increasing doses of a synthetic odour blend containing all seven components of the composition, in the presence and absence of carbon dioxide, $CO_2$.
Figure 2:
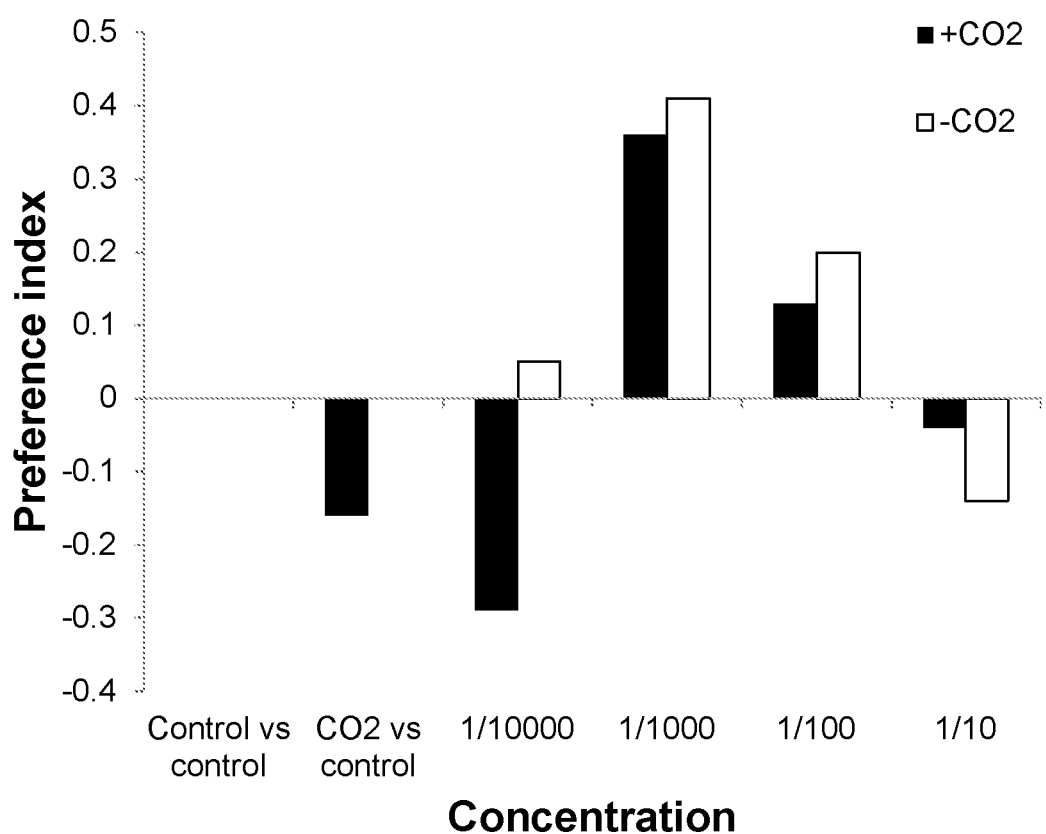
FIG. 2 is a graph showing the attraction (preference compared to a solvent control) of *Culex pipiens molestus* to increasing doses of a synthetic odour blend containing all seven components of the composition, in the presence and absence of carbon dioxide, $CO_2$.

The resulting formulation elicited short-range attraction in host-seeking *Culex pipiens* molestus and *Culex quinquefasciatus*, when tested in a bioassay, over a range of doses. The release rate that elicited the optimal behavioural responses in both species was found to be similar to that released by chickens under natural conditions. The results observed are shown in FIG. 1 and FIG. 2.

Example 2

Figure 3:
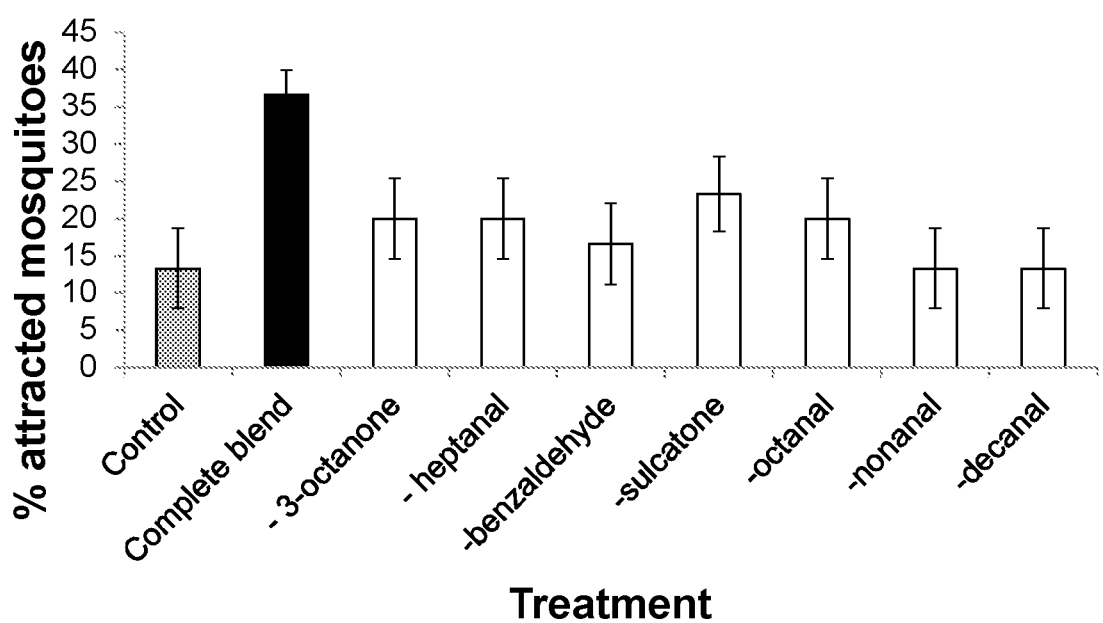
FIG. 3 is a graph showing the effect on the percentage of *Culex quinquefasciatus* attracted, after the subtraction of single components from the complete blend.
Figure 4:
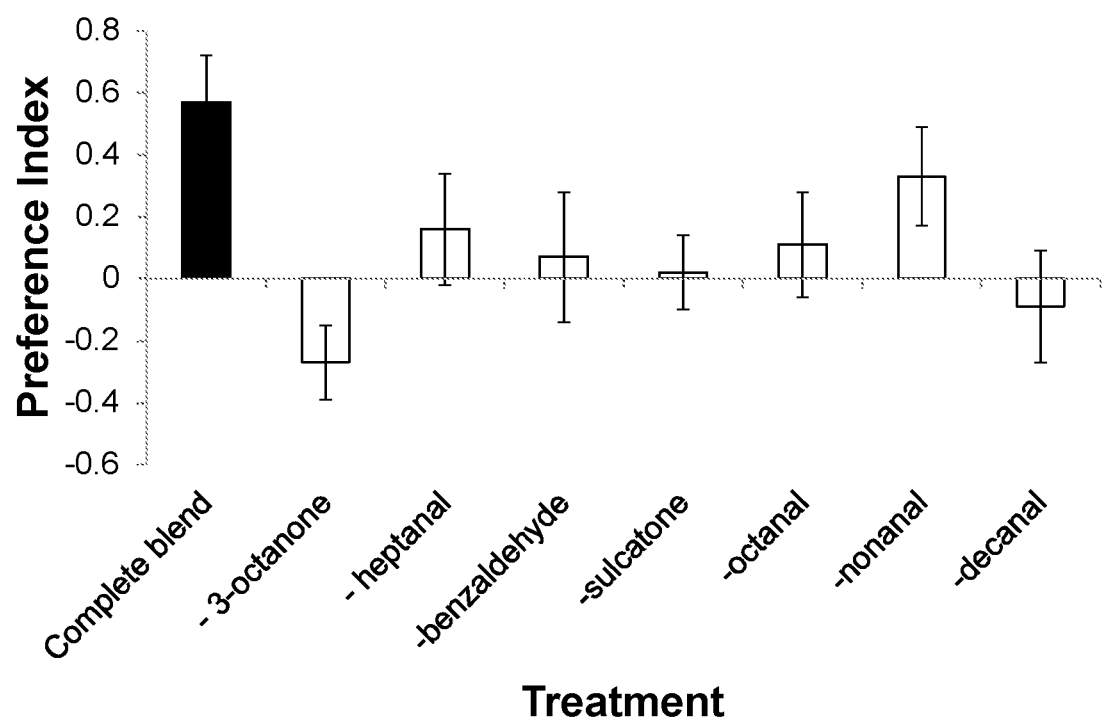
FIG. 4 is a graph showing the effect on the preference of *Culex pipiens molestus* for the complete blend and for blends in which single components were removed, compared to a solvent control.
Figure 5A:
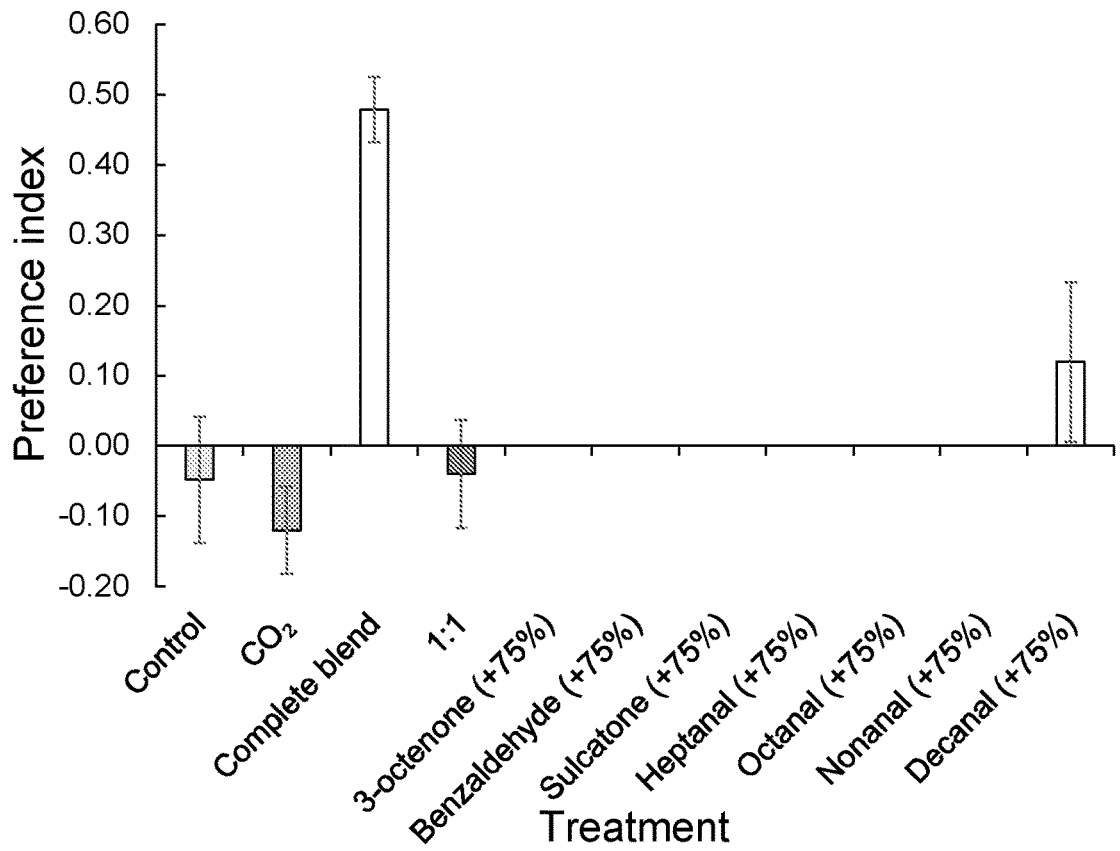
FIGS. 5a to 5f are a selection of graphs showing the behavioural analysis of *Culex quinquefasciatus* to a synthetic odour blend containing all seven components of the composition and variants of the blend in which the proportion (ranging from ±25% to ±75%) of individual components have been changed.
Figure 5B:
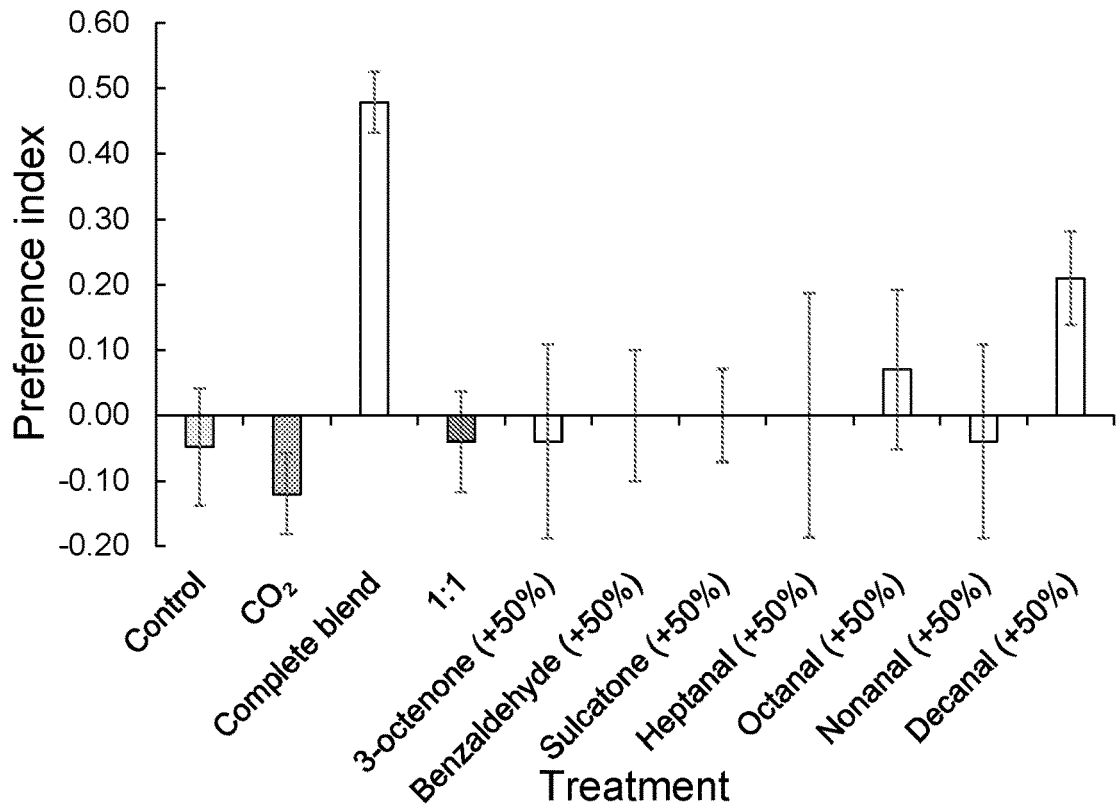
Figure 5C:
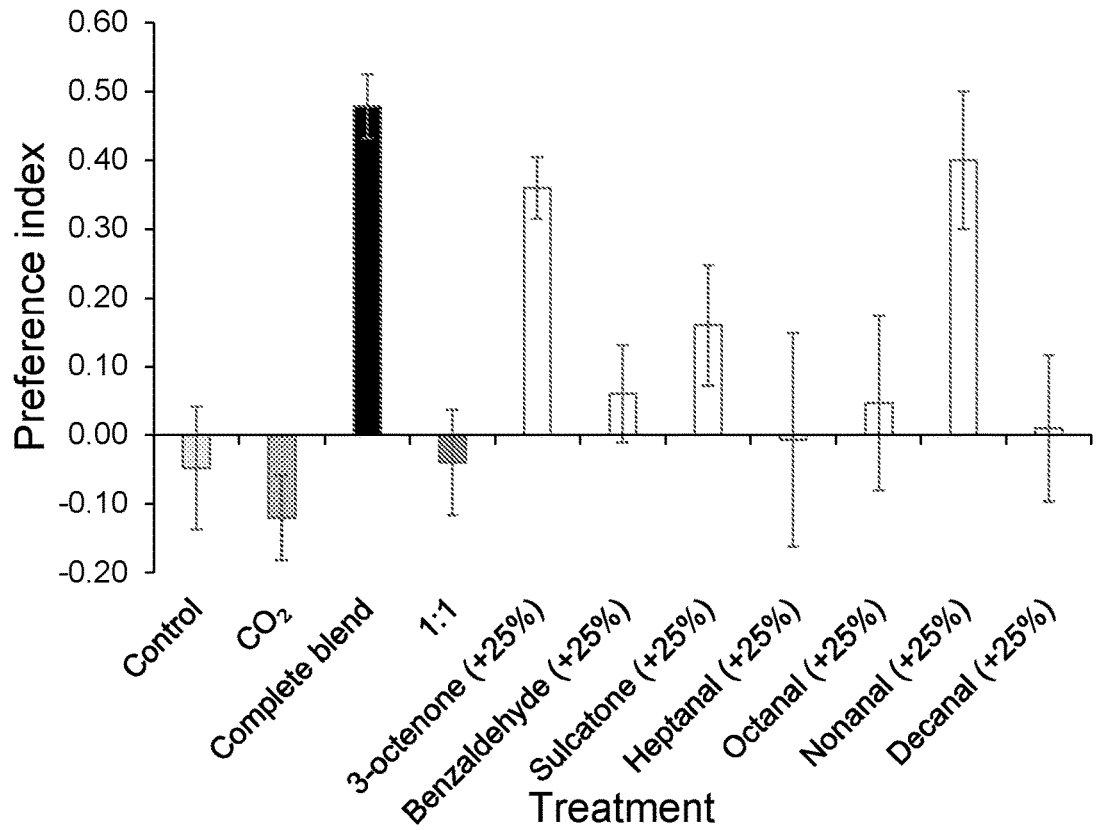
Figure 5D:
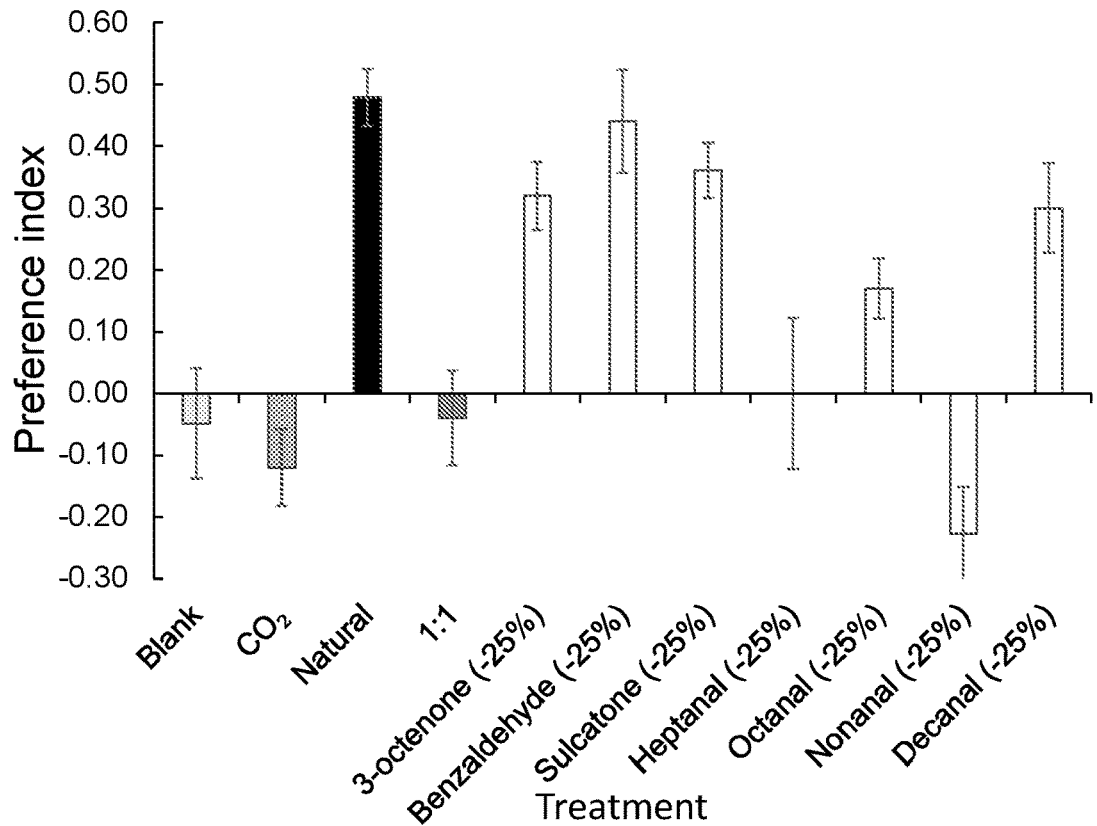
Figure 5E:
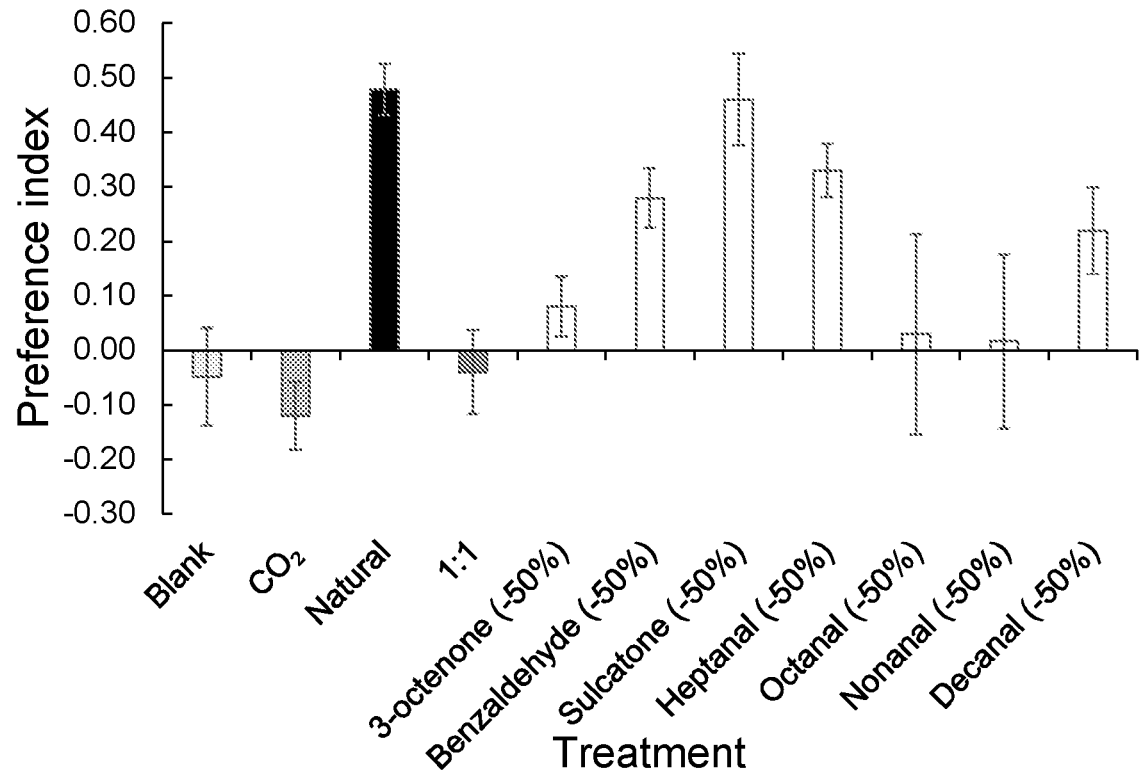
Figure 5F:
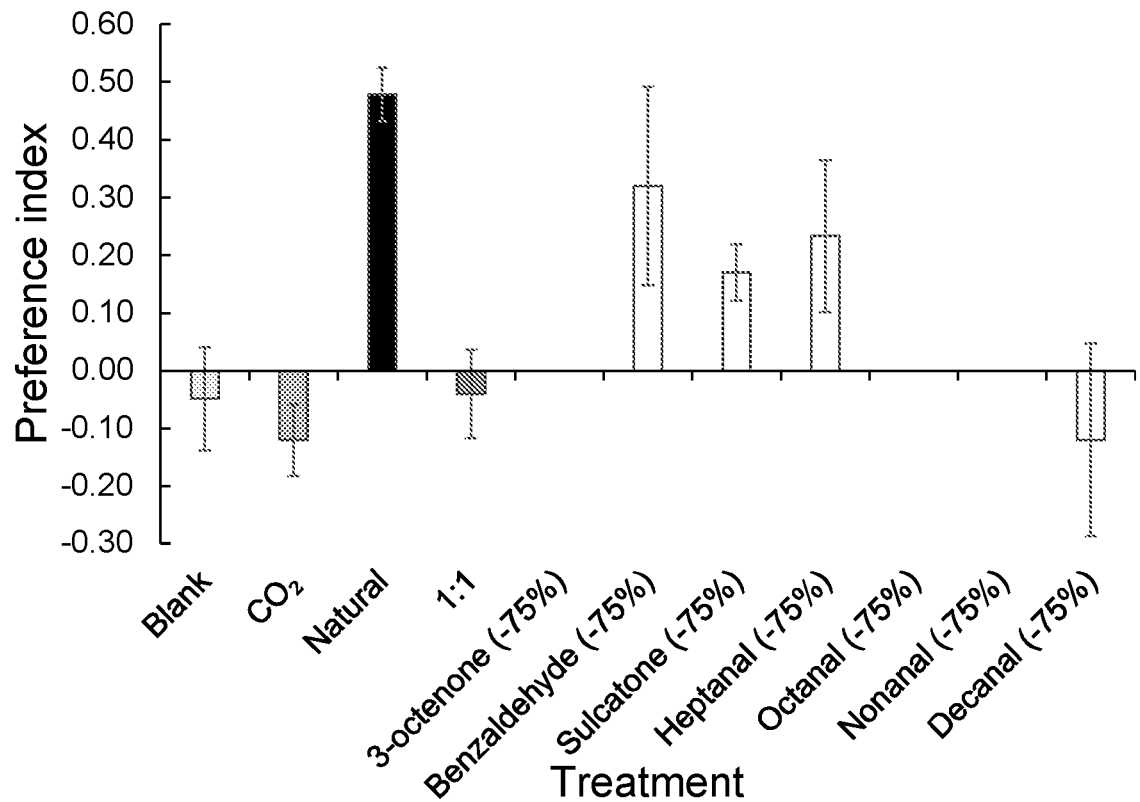

To assess the role of each individual component in the blend of Example 1, five subtractive blends from which single compounds were removed, were evaluated against the full blend in a behavioural assay. All subtractive blends were found to be less attractive than the full blend (tested at a dose of 1:1000), as shown in FIG. 3 and FIG. 4.

Example 3

The extent of how much the proportion of individual components of the blend of Example 1 could be varied without affecting attraction was assessed using *Culex quinquefasciatus*. It was found that the proportion of some compounds was able to be reduced up to 75% without significantly affecting attraction. In contrast, increasing the proportion of compounds had a significant effect on the behavioural response, as shown in FIG. 5.

Example 4

Figure 6A:
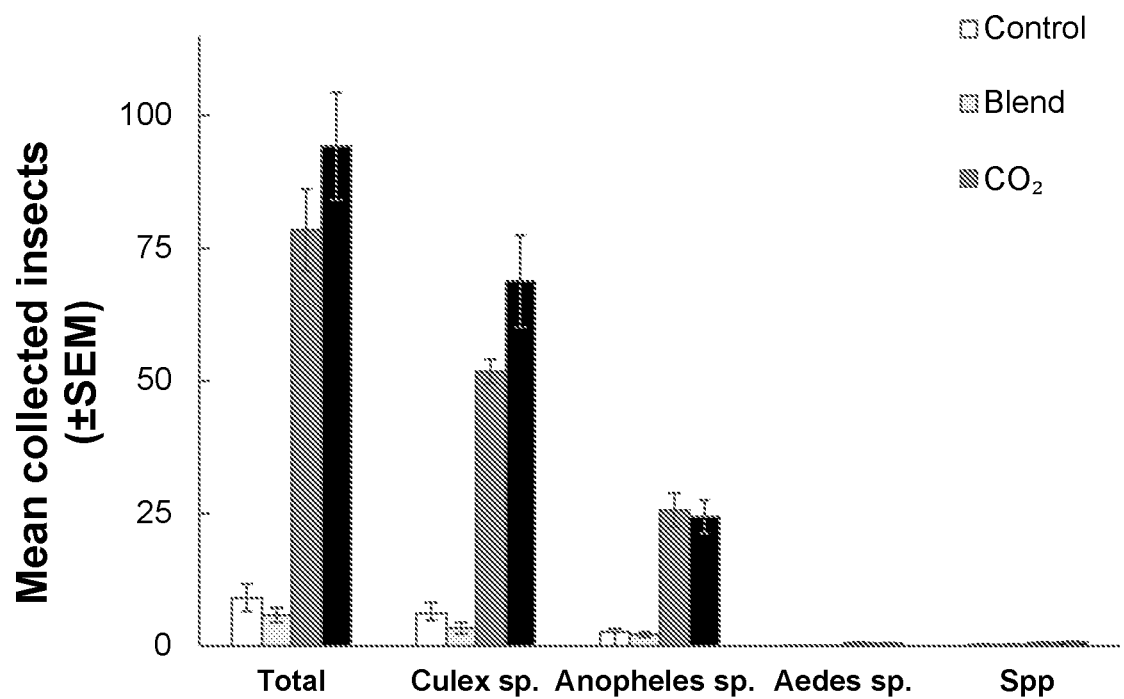
FIGS. 6a and 6b are two graphs showing the effect of different blends on the attraction of different species of mosquitoes in the USA (6a) and Greece (6b).
Figure 6B:
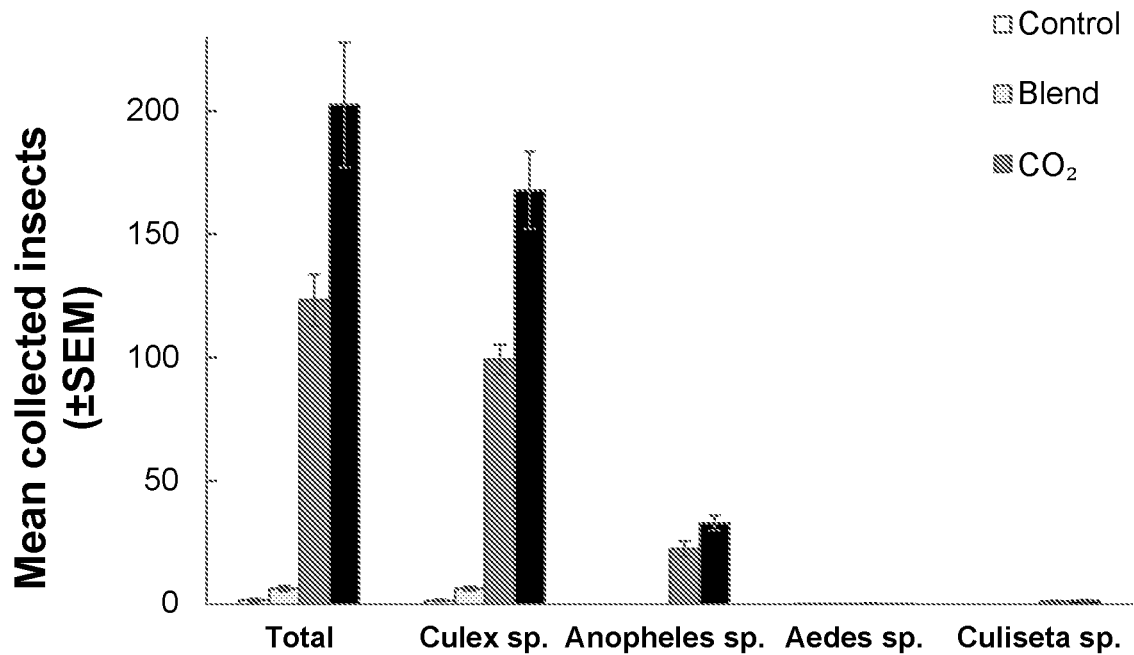

The efficacy of the attractive blend of Example 1 was tested under field conditions in comparison to a $CO_2$ baited trap, as shown in FIG. 6. Such tests were performed under controlled conditions in Greece (in 2015) and in the USA (in 2017). Both trails show an additive or synergistic effect when combining the synthetic blend with $CO_2$. In both cases the synthetic blend was released at a rate approximating the rate of natural emission.

The invention claimed is:

1. A mosquito attractant formulation comprising each of components (i) to (vii) in the amounts stated below, which amounts are indicated as a percentage of the total combined weight of components (i) to (vii):
   (i) 3-octanone in an amount of from about 3.1% to about 9.4% by weight;
   (ii) heptanal in an amount of from about 0.9% to about 1.6% by weight;
   (iii) benzaldehyde in an amount of from about 1.9% to about 3.8% by weight;
   (iv) sulcatone in an amount of from about 6.6% to about 13.1% by weight;
   (v) octanal in an amount of from about 3.1% to about 7.8% by weight;
   (vi) nonanal in an amount of from about 48.6% to about 75.0% by weight; and
   (vii) decanal in an amount of from about 9.4% to about 15.7% by weight,
   wherein the weight ratio of components (i) to (vii) in the composition is as follows:
   from about 3.1 to about 9.4 of 3-octanone:about 0.9 to about 1.6 of heptanal:from about 1.9 to about 3.8 of benzaldehyde:from about 6.6 to about 13.1 of sulcatone:from about 3.1 to about 7.8 of octanal:from about 48.6 to about 75.0 of nonanal:from about 9.4 to about 15.7 of decanal.

2. The mosquito attractant formulation of claim 1, wherein the mosquito attractant formulation comprises each of components (i) to (vii) in the amounts stated below, which amounts are indicated as a percentage of the total combined weight of components (i) to (vii):
   (i) 3-octanone in an amount of about 6.25% by weight;
   (ii) heptanal in an amount of about 1.25% by weight;
   (iii) benzaldehyde in an amount of about 2.50% by weight;
   (iv) sulcatone in an amount of about 8.75% by weight;
   (v) octanal in an amount of about 6.25% by weight;
   (vi) nonanal in an amount of about 62.50% by weight; and
   (vii) decanal in an amount of about 12.50% by weight,
   wherein the weight ratio of components (i) to (vii) in the composition is as follows:
   6.25 of 3-octanone:1.25 of heptanal:2.50 of benzaldehyde:8.75 of sulcatone:6.25 of octanal:62.50 of nonanal:12.50 of decanal.

3. The mosquito attractant formulation of claim 1, wherein the mosquito attractant formulation is provided in liquid form.

4. The mosquito attractant formulation of claim 3, wherein the mosquito attractant formulation is provided as a solution in a suitable solvent.

5. The mosquito attractant formulation of claim 3, wherein the combined weight of components (i) to (vii) is at least 0.01% of the weight of the mosquito attractant formulation.

6. The mosquito attractant formulation of claim 3, wherein the mosquito attractant formulation further comprises one or more additional component selected from the list consisting of:
   a preservative;
   a stabilizing agent;
   an anti-oxidant;
   a colorant;
   a solvent; and
   a gelling agent.

7. The mosquito attractant formulation of claim 1, wherein the mosquito attractant formulation is provided in conjunction with a suitable solid or semi-solid carrier.

8. The mosquito attractant formulation of claim 7, wherein the suitable carrier is selected from the group consisting of bio-degradable porous plastic granules and wax.

9. The mosquito attractant formulation of claim 1, wherein the mosquito attractant formulation is provided in gaseous form or as a liquified gas.

10. The mosquito attractant formulation of claim 9, wherein the mosquito attractant formulation further comprises one or more additional gaseous component such that the mosquito attractant formulation is provided as a mixture of gases, either in gaseous form or as a liquified gas.

11. The mosquito attractant formulation of claim 10, wherein the mosquito attractant formulation further comprises, as an additional gaseous component, carbon dioxide.

12. The mosquito attractant formulation of claim 9, wherein the combined weight of compounds (i) to (vii) is at least 0.01% of the formulation.

13. The mosquito attractant formulation of claim 11, wherein the amount of carbon dioxide present in the mosquito attractant formulation is at least 300 ppm.

14. The mosquito attractant formulation of claim 9, wherein the mosquito attractant formulation further comprises a carbon dioxide agonist.

15. The mosquito attractant formulation of claim 1, wherein components (i) to (vii) are the only mosquito attractant components in the mosquito attractant formulation.

16. A method of attracting and optionally trapping and/or killing mosquitoes, wherein the method comprises the step of exposing the mosquito attractant formulation of claim 1 to atmosphere containing mosquitos, thereby attracting mosquitos.

17. The method of claim 16, wherein the method further traps mosquitoes and the mosquito attractant formulation provided as part of a suitable mosquito trapping device.

18. The method of claim 16, wherein the method comprises the step of mixing the mosquito attractant formulation with gaseous carbon dioxide.

19. A combination product or kit-of-parts comprising:
(a) mosquito attractant formulation of claim 1; and
(b) a source of gaseous carbon dioxide.

20. A device for attracting and optionally trapping and/or killing mosquitoes, wherein the device comprises the mosquito attractant formulation of claim 1.

* * * * *